(12) United States Patent
Liu et al.

(10) Patent No.: US 11,665,716 B2
(45) Date of Patent: May 30, 2023

(54) METHOD, APPARATUS, AND COMPUTER READABLE MEDIUM FOR CHANNEL BONDING

(71) Applicants: Nokia Solutions and Networks Oy, Espoo (FI); Nokia Shanghai Bell Co., Ltd., Shanghai (CN)

(72) Inventors: Jianguo Liu, Shanghai (CN); Tao Tao, Shanghai (CN); Zhe Luo, Shanghai (CN); Jun Wang, Shanghai (CN); Zhuo Wu, Shanghai (CN); Gang Shen, Shanghai (CN)

(73) Assignee: Nokia Solutions and Networks Oy, Espoo (FI)

(*) Notice: Subject to any disclaimer, the term of this patent is extended or adjusted under 35 U.S.C. 154(b) by 225 days.

(21) Appl. No.: 16/958,770

(22) PCT Filed: Dec. 21, 2018

(86) PCT No.: PCT/EP2018/086815
§ 371 (c)(1),
(2) Date: Jun. 29, 2020

(87) PCT Pub. No.: WO2019/129754
PCT Pub. Date: Jul. 4, 2019

(65) Prior Publication Data
US 2020/0329470 A1   Oct. 15, 2020

(30) Foreign Application Priority Data
Dec. 29, 2017   (CN) .......................... 201711479805.9

(51) Int. Cl.
*H04W 16/14* (2009.01)
*H04W 72/51* (2023.01)
*H04W 74/08* (2009.01)

(52) U.S. Cl.
CPC ........... *H04W 72/51* (2023.01); *H04W 16/14* (2013.01); *H04W 74/0808* (2013.01)

(58) Field of Classification Search
None
See application file for complete search history.

(56) References Cited

U.S. PATENT DOCUMENTS 8,989,111 B2    3/2015  Wang et al.
2013/0242957 A1*  9/2013  Lv .......................... H04W 16/14
                                                    370/336

(Continued)

FOREIGN PATENT DOCUMENTS

CN    101730233 A    6/2010
CN    104704753 A    6/2015

(Continued)

OTHER PUBLICATIONS

International Search Report PCT/ISA/210 for International Application No. PCT/EP2018/086815 dated Feb. 14, 2019.

(Continued)

*Primary Examiner* — Jenkey Van
(74) *Attorney, Agent, or Firm* — Harness, Dickey & Pierce, P.L.C.

(57) ABSTRACT

The method implemented at a network device includes dividing a wireless system bandwidth into a plurality of non-overlapping bandwidth ranges each including a plurality of operating channels available for channel bonding. The method also includes allocating one of the plurality of bandwidth ranges for a wireless communication between the network device and a terminal device served by the network device. The method further includes determining, from the plurality of operating channels for the bandwidth range, one operating channel as a primary channel of the wireless communication. Embodiments of the present disclosure also provide a corresponding network device, a method imple- (Continued)

mented at a terminal device and a corresponding terminal device, and a non-transitory computer-readable medium.

26 Claims, 5 Drawing Sheets

(56) References Cited

U.S. PATENT DOCUMENTS

| | | | | |
|---|---|---|---|---|
| 2013/0272285 A1* | 10/2013 | Goldsmith | ............ | H04W 24/02 |
| | | | | 370/338 |
| 2014/0254510 A1* | 9/2014 | Porat | ................. | H04W 72/0493 |
| | | | | 370/329 |
| 2016/0316473 A1* | 10/2016 | Wang | ................ | H04W 72/0453 |
| 2017/0026970 A1* | 1/2017 | Pack | ................ | H04W 72/0426 |
| 2017/0164205 A1* | 6/2017 | Yang | ................ | H04W 72/0413 |
| 2017/0367099 A1* | 12/2017 | Cariou | .................. | H04W 72/08 |
| 2019/0123863 A1* | 4/2019 | Zhang | ................. | H04B 1/0064 |

FOREIGN PATENT DOCUMENTS

| | | | |
|---|---|---|---|
| CN | 105578473 A | 5/2016 | |
| CN | 107147475 A | 9/2017 | |
| WO | WO-2016058448 A1 * | 4/2016 | ............ H04W 16/10 |
| WO | WO-2016120360 A1 | 8/2016 | |
| WO | WO-2018236398 A1 | 12/2018 | |

OTHER PUBLICATIONS

CA First Office Action dated Jul. 28, 2022 in Chinese Application No. 201711479805.9.

\* cited by examiner

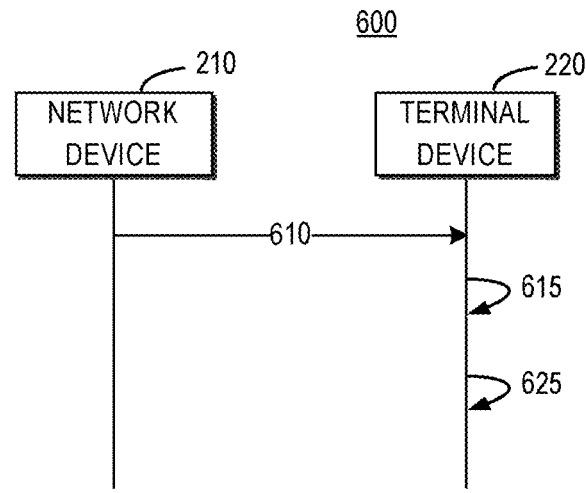

710 — RECEIVE, FROM A NETWORK DEVICE SERVING THE TERMINAL DEVICE, A FIRST MESSAGE INDICATING A BANDWIDTH RANGE FOR AN UPLINK TRANSMISSION FROM THE TERMINAL DEVICE TO THE NETWORK DEVICE, THE BANDWIDTH RANGE BEING ONE OF A PLURALITY OF NON-OVERLAPPING BANDWIDTH RANGES DIVIDED FROM A WIRELESS SYSTEM BANDWIDTH BY THE NETWORK DEVICE, THE PLURALITY OF BANDWIDTH RANGES EACH COMPRISING A PLURALITY OF OPERATING CHANNELS FOR CHANNEL BONDING

715 — RECEIVE, FROM THE NETWORK DEVICE, A SECOND MESSAGE FOR DETERMINING ONE OF THE PLURALITY OF OPERATING CHANNELS FOR THE BANDWIDTH RANGE AS A PRIMARY CHANNEL FOR THE UPLINK TRANSMISSION

METHOD, APPARATUS, AND COMPUTER READABLE MEDIUM FOR CHANNEL BONDING

CROSS-REFERENCE TO RELATED APPLICATIONS

This application is a national phase under 35 U.S.C. § 371 of PCT International Application No. PCT/EP2018/086815 which has an International filing date of Dec. 21, 2018, which claims priority to Chinese Patent Application No. 201711479805.9, filed Dec. 29, 2017, the entire contents of each of which are hereby incorporated by reference.

FIELD

Embodiments of the present disclosure generally relate to wireless communications, and more particularly to a method, an apparatus, and a computer readable medium for channel bonding for wideband access.

BACKGROUND

In latest development of wireless communication technologies, a maximum channel bandwidth per carrier can be, for example, up to 400 MHz. In line with the development of New Radio (NR) technologies in wireless communications of the next generation, a wider bandwidth can be considered in unlicensed frequency bands both below and above 6 GHz in order to provide a higher throughput.

As required in many countries or regions, technologies using unlicensed frequency bands should abide to the conformance requirement of regulations, such as Channel Access Mechanism, Nominal Channel Bandwidth, and the like. According to regulations of the European Telecommunication Standards Institute (ETSI), the Nominal Channel Bandwidth is the widest band allocated to a single channel, which should be a fixed frequency width for a single operating channel, for example, 20 MHz. Therefore, in order to support operations using a wider bandwidth, a multi-channel operation should be performed on the basis of an operating channel of a fixed frequency width, such as 20 MHz.

However, in the new generation of wireless communications, there is not an effective solution for multi-channel operations, especially for unlicensed frequency bands. Hence, there is a need to provide a solution for multi-channel wideband access operations, so as to deal with technical opportunities and challenges faced by the new generation of wireless communications.

SUMMARY

Embodiments of the present disclosure relate to a method implemented at a network device, a method implemented at a terminal device, a network device, a terminal device and a computer-readable medium.

In a first aspect of the present disclosure, there is provided a method implemented at a network device. The method comprises dividing a wireless system bandwidth into a plurality of non-overlapping bandwidth ranges each comprising a plurality of operating channels available for channel bonding. The method also comprises allocating one of the plurality of bandwidth ranges for a wireless communication between the network device and a terminal device served by the network device. The method further comprises determining, from the plurality of operating channels for the bandwidth range, one operating channel as a primary channel of the wireless communication.

In some embodiments, allocating one bandwidth range for the wireless communication may comprise: determining, through a communication between the network device and a neighboring network device, at least one of a bandwidth range used by the neighboring network device and a bandwidth range used by a terminal device served by the neighboring network device; and selecting, from the plurality of bandwidth ranges, a bandwidth range non-overlapping with the determined bandwidth range for the wireless communication.

In some embodiments, allocating one bandwidth range for the wireless communication may comprise: selecting the bandwidth range from the plurality of bandwidth ranges based on at least one of: channel traffic loads of operating channels of the plurality of bandwidth ranges and a bandwidth requirement on the wireless communication.

In some embodiments, the terminal device can be one of a plurality of terminal devices served by the network device and allocating one bandwidth range for the wireless communication may comprise: dividing the plurality of terminal devices into a plurality of groups of terminal devices based on at least one of: service types, traffic levels, call types and device identifiers of the plurality of terminal devices; selecting, from the plurality of bandwidth ranges, a bandwidth range for a group of terminal devices to which the terminal device belongs; and allocating the selected bandwidth range to the terminal device.

In some embodiments, allocating one bandwidth range for the wireless communication may comprise: selecting, from the plurality of bandwidth ranges, a bandwidth range for an uplink transmission from the terminal device to the network device; and sending to the terminal device a message indicating the selected bandwidth range.

In some embodiments, determining the primary channel may comprise: determining, through a communication between the network device and a neighboring network device, at least one of: an operating channel used by the neighboring network device as a primary channel and an operating channel used by a terminal device served by the neighboring network device as a primary channel; and selecting the determined operating channel as the primary channel.

In some embodiments, determining the primary channel may comprise: selecting the primary channel from the plurality of operating channels based on at least one of a channel interference level, a result of channel sensing, and a random manner.

In some embodiments, the terminal device and a further terminal device served by the network device can operate in a same bandwidth range and determining the primary channel may comprise: determining a same operating channel for the terminal device and the further terminal device as the primary channel.

In some embodiments, determining the primary channel may comprise: selecting, from the plurality of operating channels, an operating channel as a primary channel of an uplink transmission from the terminal device to the network device; and sending to the terminal device a message indicating the selected primary channel.

In some embodiments, determining the primary channel may comprise: sending to the terminal device a message indicating that the primary channel is to be selected from the plurality of operating channels by the terminal device.

In some embodiments, the wireless system bandwidth may comprise an unlicensed frequency band.

In a second aspect of the present disclosure, there is provided a method implemented at a terminal device. The method comprises receiving, from a network device serving the terminal device, a first message indicating a bandwidth range for an uplink transmission from the terminal device to the network device, the bandwidth range being one of a plurality of non-overlapping bandwidth ranges divided from a wireless system bandwidth by the network device, the plurality of bandwidth ranges each comprising a plurality of operating channels for channel bonding. The method also comprises receiving, from the network device, a second message for determining one of the plurality of operating channels for the bandwidth range as a primary channel for the uplink transmission.

In some embodiments, the second message may indicate one of the plurality of operating channels as the primary channel.

In some embodiments, the method can further comprise: in response to receiving the second message, selecting the primary channel from the plurality of operating channels based on at least one of: channel interference levels of the plurality of operating channels and a result of a clear channel assessment.

In some embodiments, the wireless system bandwidth may comprise an unlicensed frequency band.

In a third aspect of the present disclosure, there is provided a network device. The network device comprises at least one processor and at least one memory including computer program instructions. The at least one memory and the computer program instructions are configured, with the at least one processor, to cause the network device to divide a wireless system bandwidth into a plurality of non-overlapping bandwidth ranges each comprising a plurality of operating channels available for channel bonding. The at least one memory and the computer program instructions are also configured, with the at least one processor, to cause the network device to allocate one of the plurality of bandwidth ranges for a wireless communication between the network device and a terminal device served by the network device. The at least one memory and the computer program instructions are further configured, with the at least one processor, to cause the network device to determine, from the plurality of operating channels for the bandwidth range, one operating channel as a primary channel of the wireless communication.

In some embodiments, the at least one memory and the computer program instructions can be further configured, with the at least one processor, to cause the network device to: determine, through a communication between the network device and a neighboring network device, at least one of a bandwidth range used by the neighboring network device and a bandwidth range used by a terminal device served by the neighboring network device; and select, from the plurality of bandwidth ranges, a bandwidth range non-overlapping with the determined bandwidth range for the wireless communication.

In some embodiments, the at least one memory and the computer program instructions can be further configured, with the at least one processor, to cause the network device to: select the bandwidth range from the plurality of bandwidth ranges based on at least one of: channel traffic load of operating channels of the plurality of bandwidth ranges and a bandwidth requirement on the wireless communication.

In some embodiments, the terminal device is one of a plurality of terminal devices served by the network device and the at least one memory and the computer program instructions can be configured, with the at least one processor, to cause the network device to: divide the plurality of terminal devices into a plurality of groups of terminal devices based on at least one of: service types, traffic levels, call types and device identifiers of the plurality of terminal devices; select, from the plurality of bandwidth ranges, a bandwidth range for a group of terminal devices to which the terminal device belongs; and allocate the selected bandwidth range to the terminal device.

In some embodiments, the at least one memory and the computer program instructions can be further configured, with the at least one processor, to cause the network device to: select, from the plurality of bandwidth ranges, a bandwidth range for an uplink transmission from the terminal device to the network device; and send to the terminal device a message indicating the selected bandwidth range.

In some embodiments, the at least one memory and the computer program instructions can be further configured, with the at least one processor, to cause the network device to: determine, through a communication between the network device and a neighboring network device, at least one of: an operating channel used by the neighboring network device as a primary channel and an operating channel used by a terminal device served by the neighboring network device as a primary channel; and select the determined operating channel as the primary channel.

In some embodiments, the at least one memory and the computer program instructions can be further configured, with the at least one processor, to cause the network device to: select the primary channel from the plurality of operating channels based on at least one of: a channel interference level, a result of channel sensing, and a random manner.

In some embodiments, the terminal device and a further terminal device served by the network device may operate in a same bandwidth range and the at least one memory and the computer program instructions can be further configured, with the at least one processor, to cause the network device to: determine a same operating channel for the terminal device and the further terminal device as the primary channel.

In some embodiments, the at least one memory and the computer program instructions can be further configured, with the at least one processor, to cause the network device to: select, from the plurality of operating channels, an operating channel as a primary channel of an uplink transmission from the terminal device to the network device; and send to the terminal device a message indicating the selected primary channel.

In some embodiments, the at least one memory and the computer program instructions can be further configured, with the at least one processor, to cause the network device to: send to the terminal device a message indicating that the primary channel is to be selected from the plurality of operating channels by the terminal device.

In some embodiments, the wireless system bandwidth may comprise an unlicensed frequency band.

In a fourth aspect of the present disclosure, there is provided a terminal device. The terminal device comprises at least one processor and at least one memory including computer program instructions. The at least one memory and the computer program instructions are configured, with the at least one processor, to cause the terminal device to receive, from a network device serving the terminal device, a first message indicating a bandwidth range for an uplink transmission from the terminal device to the network device, the bandwidth range being one of a plurality of non-overlapping bandwidth ranges divided from a wireless system bandwidth by the network device, the plurality of bandwidth ranges each comprising a plurality of operating channels for channel bonding. The at least one memory and the computer program instructions are also configured, with the at least one processor, to cause the terminal device to receive, from the network device, a second message for determining one of the plurality of operating channels for the bandwidth range as a primary channel for the uplink transmission.

In some embodiments, the second message can indicate one of the plurality of operating channels as the primary channel.

In some embodiments, the at least one memory and the computer program instructions can be further configured, with the at least one processor, to cause the terminal device to: in response to receiving the second message, select the primary channel from the plurality of operating channels based on at least one of: channel interference levels of the plurality of operating channels and a result of a clear channel assessment.

In some embodiments, the wireless system bandwidth comprises an unlicensed frequency band.

In a fifth aspect of the present disclosure, there is provided a computer-readable medium. The computer-readable medium includes machine-executable instructions, the machine-executable instructions, when being executed, causing a machine to perform steps of the method according to the first aspect.

In a sixth aspect of the present disclosure, there is provided a computer-readable medium. The computer-readable medium includes machine-executable instructions, the machine-executable instructions, when being executed, causing a machine to perform steps of the method according to the second aspect.

BRIEF DESCRIPTION OF THE DRAWINGS

Through the following detailed description with reference to the accompanying drawings, the above and other objectives, features, and advantages of embodiments of the present disclosure will become more apparent. Several example embodiments of the present disclosure will be illustrated by way of example but not limitation in the drawings in which:

FIG. 6 illustrates a further example diagram of signaling interactions between a network device and a terminal device in accordance with embodiments of the present disclosure;

FIG. 7 illustrates a flowchart of a method implemented at a terminal device in accordance with embodiments of the present disclosure.

Figure 1:
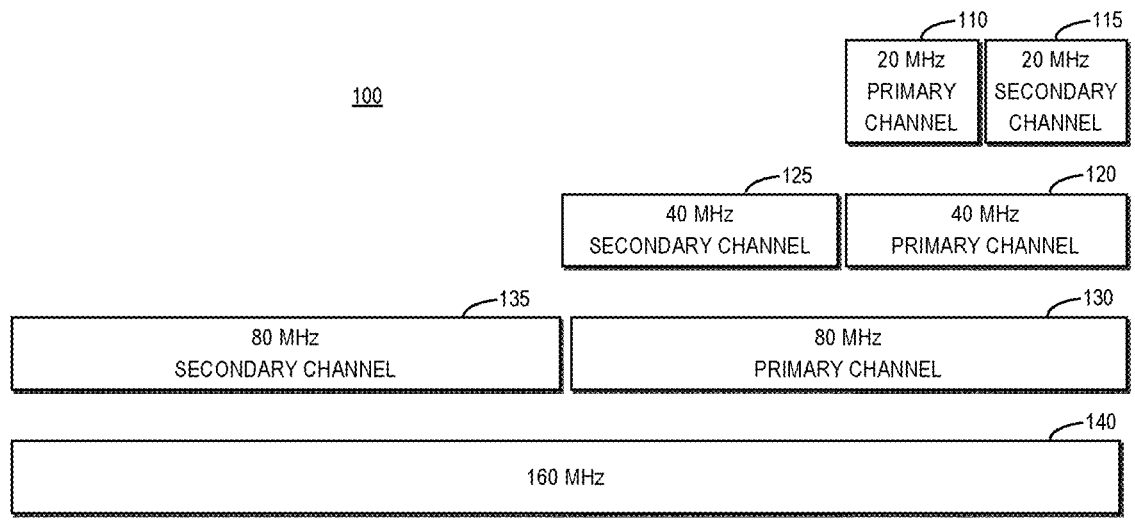
FIG. 1 illustrates a schematic diagram of a channel bonding mechanism of a Wi-Fi system.

Throughout the drawings, same or similar reference signs are used to represent same or similar components.

DETAILED DESCRIPTION OF EMBODIMENTS

Principles and spirits of the present disclosure will be described below with reference to various example embodiments illustrated in the drawings. It should be appreciated that description of those embodiments is merely to enable those skilled in the art to better understand and implement the present disclosure and is not intended for limiting the scope of the present disclosure in any manner.

As used herein, the term "includes" and its variants are to be read as open-ended terms that mean "includes, but is not limited to." The term "based on" is to be read as "based at least in part on." The term "one embodiment" and "the embodiment" are to be read as "at least one embodiment." The terms "first", "second" and so on can refer to same or different objects. The following text also may comprise other explicit and implicit definitions. As used herein, the term "determine" encompasses a variety of actions, for example, "determine" may comprise computation, calculation, export, research, look up (such as looking up in a table, a database or a further data structure), and find out or the like. Additionally, "determine" may comprise receiving (for example, receiving information), accessing (for example, accessing data in the memory) and the like. Moreover, "determine" may comprise parsing, choice, selection and establishing or the like.

The term "terminal device" or "user equipment" (UE) indicates any terminal devices capable of performing wireless communications with base stations or with each other. As an example, the terminal device may comprise a mobile terminal (MT), a subscriber station (SS), a portable subscriber station (PSS), a mobile station (MS) or an access terminal (AT) and the above devices mounted on vehicles. The terminal device, for example, can be mobile terminal, fixed terminal or portable terminal of any types, including mobile phone, site, unit, device, multimedia computer, multimedia tablet, Internet nodes, communicator, desktop computer, laptop computer, notebook computer, netbook computer, tablet computer, Personal Communication System (PCS) device, personal navigation device, Personal Digital Assistant (PDA), audio/video player, digital camera/video, positioning device, television receiver, radio broadcast receiver, electronic book device, gaming device, smart electric meters, metrical instruments or other devices available for communications or any combinations thereof. The terms "terminal device" and "user device" can be used interchangeably in the context of the present disclosure for the purpose of discussion.

As used herein, the term "network device" refers to other entities or nodes having a particular function in a base station or a communication network. The term "base station" (BS) can represent a node B (NodeB or NB), an evolution node B (eNode B or eNB), gNB, a remote radio unit (RRU), a radio frequency head (RH), a remote radio head (RRH), a relay, or low power nodes, such as pico base station or femto base station and so on. Coverage of a base station, i.e., a geographic area which can provide service, is known as a cell. In the context of the present disclosure, the terms "network device" and "base station" are used interchangeably for the sake of discussion and eNB may serve as a main example of the network device. Both "network device" and "terminal device" can be referred to as communication device in the context.

As mentioned above, in order to support operations using a wider bandwidth, a multi-channel operation should be performed on the basis of a single operating channel of a fixed frequency width, such as 20 MHz. In an updated version of the ETSI, two options are specified for multi-channel access operations in unlicensed frequency bands. In a first option, a communication device can perform simultaneous transmissions in any combination of operating channels as long as every operating channel (for example, 20 MHz) in the combination satisfies the channel access requirements. In a second option, the communication device can only use a particular combination/group of operating channels (for example, 20 MHz), which combination/group is a plurality of channels bonded on the basis of a channel bonding rule, such as 40 MHz, 80 MHz, or 160 MHz and the like.

In the further development of wireless communications, the second option of the ETSI may be a good candidate for multi-channel access operations based on the following considerations. First of all, channel bonding is commonly practiced in the Wi-Fi standard, and channel access with non-adjacent operating channels would break the channel bonding rule of the Wi-Fi. From the viewpoint of access fairness, the above second option is more suitable when LTE-based Radio Access Technology (RAT) co-exists with other RATs like the Wi-Fi.

Second, bonding of adjacent operating channels can naturally support wideband carrier operations with a single Radio Frequency (RF) chain. According to the definition in the ESTI, when a communication device has simultaneous transmissions in adjacent channels, these transmissions may be considered as one signal with an actual Nominal Channel Bandwidth of "n" times the bandwidth of a single nominal channel, where n is the number of adjacent channels. In this case, such a wideband carrier operation has low-cost efficiency with less RF chains and achieves higher bandwidth utilization with less guard periods, compared with a carrier aggregation scheme which operates with non-contiguous channels. Of course, the bonding of contiguous channels can not only be used for wideband carrier operations, but also for carrier aggregation operations. Accordingly, it is necessary to study applying the channel bonding mechanism to multi-channel wideband access operations, especially the multi-channel access operations in unlicensed frequency bands. The channel bonding mechanism will be briefly introduced below by taking the Wi-Fi system as an example.

FIG. 1 illustrates a schematic diagram 100 of a channel bonding mechanism of a Wi-Fi system. The size of a channel bandwidth is defined as 20 MHz in the Wi-Fi Standard (and the ETSI). The number of independent channels varies among different countries and regions, but most countries and regions allow at least three operating channels in the 2.4 GHz frequency band (for example, 802.11g) and at least five operating channels in the 5 GHz frequency band (for example, 802.11a). The channel bonding is firstly introduced into 802.11n to allow 40 MHz channels, and then ultimately extended further in 802.11ac to allow 80 MHz and 160 MHz channels.

As shown in FIG. 1, the channel access for the Wi-Fi system (for example, 802.11n/ac) follows a hierarchical channel bonding mechanism, which allows combinations of contiguous 20 MHz sub-channels in a non-overlapping manner to implement bonding of 20 MHz, 40 MHz, 80 MHz and 160 MHz. The key features of the channel bonding are: a full CSMA/CA happens only on a primary channel of 20 MHz; a secondary channel (20 MHz, 40 MHz, or 80 MHz) can be used if the corresponding primary channel is used; a short clear channel assessment (CCA) is performed on the secondary channel before the LBT on the primary channel ends; and selection of the primary channel defines which secondary channels can be used.

In the example of FIG. 1, on the assumption that the 20 MHz channel 110 is selected as the primary channel and an adjacent 20 MHz channel 115 is idle, bonding of the two channels can be performed to form a 40 MHz primary channel 120. Similarly, if an adjacent 40 MHz channel 125 of the primary channel 120 is idle, bonding of the primary channel 120 and the channel 125 can be performed to form an 80 MHz primary channel 130. Further, if an adjacent 80 MHz channel 135 of the primary channel 130 is idle, bonding of the primary channel 130 and the channel 135 can be performed to form a 160 MHz primary channel 140.

Moreover, in the 802.11 standards, each terminal device uses the same channel (such as 20 MHz) designated by a network device as the primary channel, which will cause the following problems. On one hand, it is difficult to support multi-channel multiplexing in the frequency domain due to a co-channel collision. On the other hand, the interference/traffic level of the candidate channel is different for each terminal device and the approach to select the primary channel is not optimized for the performance of channel access.

Different from the Wi-Fi system, the selection of the primary operating channel in the ESTI regulations shall follow the following procedure. First of all, the primary operating channel is selected uniformly and randomly whenever a Contention Window (CW) corresponding to a complete transmission on the current primary operating channel is set to its minimum value (CWmin). For this procedure, a Contention Window (CW) is maintained for each priority class inside each 20 MHz operating channel within the bonded channel. Second, the primary operating channel can be arbitrarily determined and cannot be changed more than once per second.

According to the ETSI regulations, a transmitter in a wireless system should perform a "Listen-Before-Talk (LBT)" procedure on the primary channel and a transmission on other operating channels is allowed only if the primary channel is idle after a successful LBT. Since all channel access timing should be based on a result of a clear channel assessment (CCA) on the primary channel (such as 20 MHz), the determination of the primary channel has a great impact on channel access and bonding ability.

Furthermore, in the ETSI regulations, the primary operating channel can be selected uniformly and randomly or determined arbitrarily. In comparison with the random selection of the primary channel, it is necessary to select the primary channel by considering the interference/traffic level of candidate channels and performance requirements of nearby communication devices from a local cell or network. In a Licensed Assisted Access (LAA)/Multefire system, the primary channel is determined by the transmitter. In other words, a primary channel for the downlink is selected by a network device and a primary channel for the uplink is selected by a terminal device. As any combination of operating channels is allowed in the LAA/Multefire system, the selection of the primary channel will not affect the channelization. However, for channel bonding operations, only a subset of bonded channels (for example, a contiguous 40 MHz, 80 MHz, or 160 MHz channel) is allowed for a Downlink (DL)/Uplink (UL) transmission.

Therefore, some issues arise if the primary channel is the selected by the terminal device in the uplink access. Specifically, if the primary channel is determined by the terminal device, it is likely to have an issue of co-channel collision among neighboring nodes, which may result in low channel utilization and low access probability. For example, if the primary channels of two neighboring terminal devices are adjacent or very close, a transmission of one terminal device would cause that the other terminal device can only transmit on a narrow bandwidth as the operating channels around its primary channel are occupied by its neighboring terminal device.

In addition, if a terminal device transmits on a bonded channel which includes the primary channel of its neighboring terminal device, the neighboring terminal device would have no chance to access the channel due to an LBT failure on the primary channel even if other adjacent channels are idle. As the terminal device cannot detect/measure a transmission on the primary channel from nearby communication devices, the above issues can hardly be solved if the terminal device determines the primary channel itself. If a network device determines, for its served terminal device, a primary channel for an uplink multi-channel operation, the above issues can be avoided through intra/inter-cell coordination operations for the determination of the primary channel.

Furthermore, if the primary channel is determined by the network device for the uplink multi-channel wideband access operations, blind detection complexity of dynamic channel bonding operations would be reduced. Through detecting the primary channel (for example, 20 MHz), the network device will know whether a terminal device successfully accesses the channel and a bandwidth of a bonded channel of each terminal device, with the assistance of UL signaling design in the primary channel. Therefore, in the uplink access, it is necessary to support a network device to configure a primary channel for a terminal device to perform a channel bonding operation.

Similar to the uplink, the selection of the primary channel for downlink has the same channelization issues if there is no coordination among the neighboring network devices. If the neighboring network devices/cells can exchange or detect the primary channel for downlink channel access, the network devices can avoid the co-channel interference/collision and achieve benefits from an extended channel bandwidth.

In view of the above or other issues in the existing multi-channel access operations, embodiments of the present disclosure propose a solution to enhance the primary channel selection for wideband access operations to address these issues, especially for unlicensed frequency bands. For example, the solution can satisfy system requirements such as access performance, collision avoidance or channel extension, and so on. Besides, the solution obeys the channel-bonding regulatory requirement in the ETSI regulations.

A basic idea of embodiments of the present disclosure is to allocate the primary channel for wideband access by a serving network device based on a given allocation rule, so as to achieve the benefits of an extended channel bandwidth and avoid a co-channel collision among communication devices. A wireless communication system in which embodiments of the present disclosure can be implemented is generally described below with reference to FIG. 2 first, and the solution for multi-channel access operations proposed by embodiments of the present disclosure is then described in details with reference to FIGS. 3 to 7.

Particularly, in order to better explain principles and ideas of the present disclosure, several values may be mentioned in the following description. It should be understood that these values are exemplary and are not intended to limit the scope of the present disclosure in any manners. In accordance with specific requirements and implementation environments, any other suitable values are also feasible.

Figure 2:
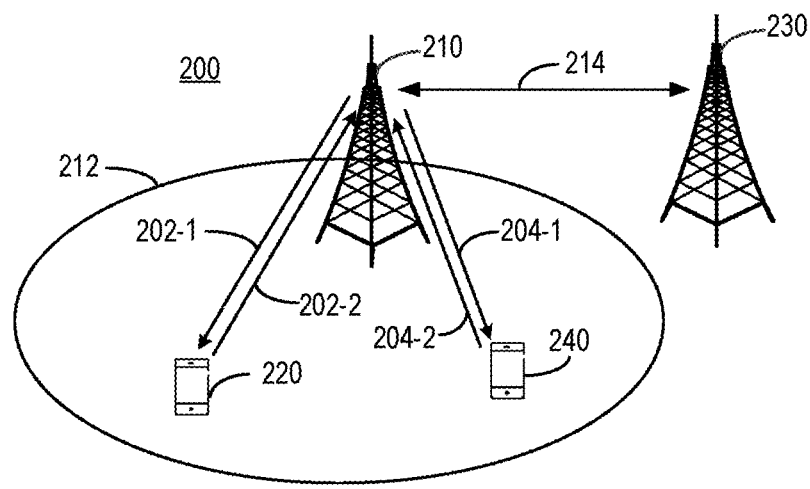
FIG. 2 illustrates a wireless communication system in which embodiments of the present disclosure can be implemented.

FIG. 2 illustrates a wireless communication system 200 in which embodiments of the present disclosure can be implemented. In the wireless communication system 200, a plurality of terminal devices 220, 240, and so on are located in a serving cell 212 of a network device 210 and served by the network device 210. Although FIG. 2 shows two terminal devices 220 and 240 in the form of mobile phones, the network device 210 can serve more or less terminal devices and the served terminal devices can be identical or different in type (for example, other types of terminal devices are also possible). In addition, although FIG. 2 shows two network devices 210 and 230, the wireless communication system 200 may include any number of network devices.

The network device 210 and the terminal devices 220 and 240 can communicate with each other to transmit various traffic data, control information and the like. During the communication procedure, a transmitting terminal can be the network device 210 and a receiving terminal can be the terminal device 220, and such a transmission can be referred to as a downlink (DL) transmission 202-1. In other cases, the transmitting terminal can be the terminal device 220 and the receiving terminal can be the network device 210, and this transmission can be known as an uplink (UL) transmission 202-2. Similarly, a downlink transmission 204-1 and an uplink transmission 204-2 can be performed between the network device 210 and the terminal device 240.

In the following, the downlink transmission 202-1 and the uplink transmission 202-2 between the network device 210 and the terminal device 220 can be collectively referred to as the wireless communication 202 between the network device 210 and the terminal device 220. Likewise, the downlink transmission 204-1 and the uplink transmission 204-2 between the network device 210 and the terminal device 240 can be collectively referred to as the wireless communication 204 between the network device 210 and the terminal device 240. Moreover, the network device 210 can also communicate with another network device (such as a neighboring network device) 230 via a communication link 214 (for example, X2 interface or the like) as further illustrated in FIG. 2.

It should be appreciated that the communications in the wireless communication system 200 can be implemented according to any suitable communication protocols, including but not limited to, First Generation (1G), Second Generation (2G), Third Generation (3G), Fourth Generation (4G) and Fifth Generation (5G) cellular communication protocols, for example, wireless local area network communication protocols such as Institute of Electrical and Electronic Engineers (IEEE) 802.11, and/or currently known or to be developed any other protocols.

Figure 3:
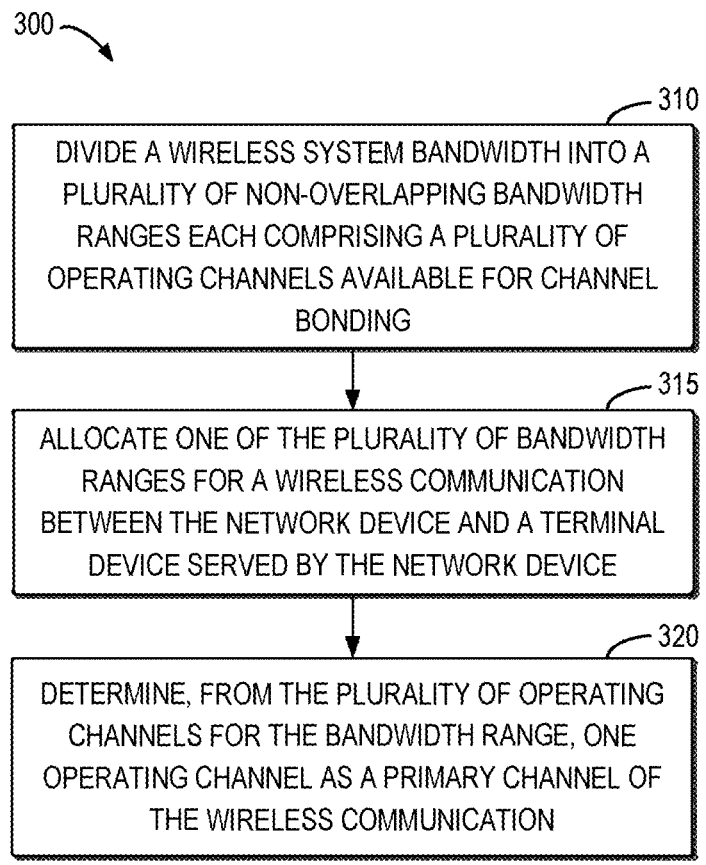
FIG. 3 illustrates a flowchart of a method implemented at a network device in accordance with embodiments of the present disclosure.

FIG. 3 illustrates a flowchart of a method 300 implemented at a network device in accordance with embodiments of the present disclosure. In some embodiments, the method 300 can be implemented, for example, at the network device 210 shown in FIG. 2. For the purpose of description, the method 300 will be explained below with reference to the wireless communication system 200 shown in FIG. 2, especially with reference to the wireless communication between the network device 210 and the terminal device 220. It should be understood that other network devices (such as the network device 230) in the wireless communication system 200 can perform the method 300 in a similar way. Additionally, the network device 210 can also perform the method 300 for other terminal devices (such as the terminal device 240) in a similar way.

As shown in FIG. 3, the network device 210 divides, at 310, a wireless system bandwidth into a plurality of non-overlapping bandwidth ranges, each of which includes a plurality of operating channels available for channel bonding. In accordance with the idea of the embodiments of the present disclosure, in order to avoid breaking the channelization structure of bonded channels in the wireless communication system 200, the network device 210 first divides the wireless system bandwidth into a plurality of non-overlapping bandwidth ranges and performs a multi-channel operation based on the divided bandwidth ranges. These bandwidth ranges can also be referred to as channel extension regions (CERs), which may be composed of a plurality of contiguous operating channels in the wireless system bandwidth, i.e., may include a plurality of operating channels available for channel bonding. For example, the operating channels can be bonded together based on a hierarchical channel bonding mechanism.

It should be appreciated that a channel extension region (CER) refers to a bandwidth range or bandwidth region which is extended by the primary channel preferentially through a channel bonding operation. However, the channel bonding operations of the primary channel are not restricted to be performed within the bandwidth range or bandwidth region only. For example, a primary channel in a certain channel extension region can extend the bonded channel to an adjacent channel extension region through a channel bonding operation, for example, this may be the case where the operating channels in the channel extension region of the adjacent channel are in an idle state.

In some embodiments, the network device 210 can semi-statically divide the wireless system bandwidth in accordance with the channel bonding rule. For example, the channel bonding rule can restrict the bandwidth range to $2^n$ times a single operating channel bandwidth (such as 20 MHz), where n is an integer greater than or equal to 0, such as 20 MHz, 40 MHz, 80 MHz and 160 MHz, and so on. It should be understood that other channel bonding rules and dividing manners are also possible and embodiments of the present disclosure are not limited to the listed examples.

In some embodiments, the wireless system bandwidth divided by the network device 210, for example, may include an unlicensed frequency band. However, it should be appreciated that the dividing approach of the wireless system bandwidth provided by embodiments of the present disclosure is also suitable for other frequency bands (such as licensed frequency bands). A specific example of dividing the wireless system bandwidth into a plurality of non-overlapping bandwidth ranges is described below with reference to FIG. 4.

Figure 4:
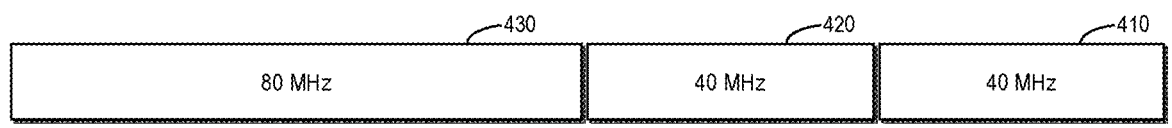
FIG. 4 illustrates a schematic diagram of dividing a wireless system bandwidth into a plurality of bandwidth ranges in accordance with embodiments of the present disclosure.

FIG. 4 illustrates a schematic diagram of dividing the wireless system bandwidth 400 into a plurality of bandwidth ranges 410-430 in accordance with embodiments of the present disclosure. As shown in FIG. 4, assuming the example wireless system bandwidth 400 is 160 MHz and a single operating channel has a bandwidth of 20 MHz, the wireless system bandwidth 400 should be channelized based on the 20 MHz operating channels.

In the example of FIG. 4, the wireless system bandwidth 400 is divided into three non-overlapping bandwidth ranges 410-430, wherein the bandwidth range 410 is 40 MHz, the bandwidth range 420 is 40 MHz, and the bandwidth range 430 is 80 MHz. In this event, if the channelization structure of the bonded channel is not damaged (for example, a co-channel collision due to overlapping with a bonded channel of the neighboring network device 230), the expected bandwidths to be achieved by the bonded channels for the bandwidth ranges 410-430 are at least 40 MHz, 40 MHz and 80 MHz.

Referring back to FIG. 3, the network device 210 at 315 allocates one of the plurality of bandwidth ranges 410-430 for the wireless communication 202 between the network device 210 and the terminal device 220 served by the network device 210. To achieve the benefits brought by an extended channel bandwidth, it would be advantageous that the bandwidth range used by the network device 210 for the wireless communication 202 does not overlap with the bandwidth range used by the neighboring network device 230. Similarly, for the uplink transmission 202-2, it is advantageous that the bandwidth range used by the terminal device 220 served by the network device 210 does not overlap with that used by the terminal device served by the neighboring network device 230.

Therefore, in some embodiments, the network device 210 can determine, through the communication 214 between the network device 210 and the neighboring network device 230, a bandwidth range used by the neighboring network device 230 and/or by a terminal device served by the neighboring network device 230. For example, the network device 210 may exchange, via the communication 214, the division of the bandwidth ranges with the neighboring network device 230. The communication 214 can be performed through X2 signaling or a specially-designed new air interface signaling. Accordingly, the network device 210 can select for the wireless communication 202, from the plurality of bandwidth ranges 410-430, a bandwidth range non-overlapping with the determined bandwidth range. For example, the network device 210 can select a bandwidth range non-overlapping with the bandwidth range utilized by the network device 230 for the downlink transmission 202-1, or the network device 210 can inform the terminal device 220 of a bandwidth range non-overlapping with the bandwidth range utilized by a terminal device served by the network device 230 for the uplink transmission 202-2.

Specifically, in the example of FIG. 4, assuming that the bandwidth requirement of the network device 210 for the downlink transmission 202-1 is 40 MHz, the network device 210 may first take the bandwidth ranges 410 and 420 as candidate bandwidth ranges based on one metric (for example, the bandwidth requirement). If the bandwidth range 410 has been occupied by the network device 230, the network device 210 can use the bandwidth range 420 as the bandwidth range for the downlink wideband access.

In some embodiments, if there is not a non-overlapping bandwidth range or the inter-cell coordination is unavailable between the network device 210 and the network device 230, the network device 210 may select based on some metrics, from the plurality of bandwidth ranges 410-430, a suitable bandwidth range for wideband channel access. For example, the metrics may include channel traffic loads of operating channels of the plurality of bandwidth ranges 410-430 and the bandwidth requirement on the wireless communication 202 or the like.

Still referring to the example of FIG. 4, if the bandwidth ranges 410 and 420 are occupied by the network device 230 and/or other neighboring network devices, the network device 210 can select one of the bandwidth ranges 410 and 420 as its bandwidth range based on other metrics. For example, a duty cycle on a candidate operating channel can be a metric for selecting the bandwidth range, where the duty cycle is defined as a ratio of a channel busy period to a channel observation period on the basis of channel sensing.

In such case, the network device 210 may listen to the operating channels in the bandwidth ranges 410 and 420 and semi-statically estimate the duty cycles of the operating channels in the candidate bandwidth ranges (i.e., the bandwidth ranges 410 and 420). At last, the network device 210 can select a bandwidth range with a lower duty cycle for its downlink wideband access.

In some embodiments, the network device 210 can also allocate the bandwidth range for each terminal device. For this purpose, the network device 210 may divide a plurality of the served terminal devices 220, 240 and the like into a plurality of groups of terminal devices. The terminal devices can be divided based on the following metrics, for example, service types, traffic levels, call types and device identifiers of the terminal devices or the like. As an example, the network device 210 can divide the terminal devices 220 and 240 and so on into Enhanced Mobile Broadband (eMBB) terminal devices and Enhanced Machine-Type Communication (eMTC) terminal devices.

As such, the network device 210 may select, from the plurality of bandwidth ranges 410-430, a bandwidth range for a group of terminal devices to which the terminal device 210 belongs. For example, the group of eMBB terminal devices with a higher bandwidth requirement may be allocated with the bandwidth range 430 to obtain a broader extended bandwidth, while the group of eMTC terminal devices with a lower bandwidth requirement may be allocated with the bandwidth range 410 or 420. On this basis, the network device 210 can allocate the selected bandwidth range to the terminal device 220.

As described above, the wireless communication 202 between the network device 210 and the terminal device 220 may include the uplink transmission 202-2. For the uplink transmission 202-2, the network device 210 can select, from the plurality of bandwidth ranges 410-430, a bandwidth range for the uplink transmission 202-2 from the terminal device 220 to the network device 210, so as to support a channel bonding operation of the uplink. To enable the terminal device 220 to perform the uplink transmission 202-2 with the selected bandwidth range, the network device 210 can send to the terminal device 220 a message indicating the selected bandwidth range. For example, the message can be RRC signaling or L1 signaling specific to a UE or to a group.

Furthermore, in some embodiments, the network device 210 can semi-statically select and allocate the bandwidth range for the terminal device 220 and indicate the selected bandwidth range to the terminal device 220 via the RRC signaling, after considering a signaling overhead and latency of a signaling exchange among a plurality of neighboring network devices for determination of the bandwidth range.

Referring back to FIG. 3, after the bandwidth range is allocated for the wireless communication 202, the network device 210 may select, in the allocated bandwidth range, a primary channel for the channel bonding operations for the downlink 202-1; and the network device 210 or the terminal device 220 can select, in the allocated bandwidth range, a primary channel for the channel bonding operations for the uplink 201-2. This is depicted in FIG. 3. At 320, the network device 210 determines, from the plurality of operating channels for the bandwidth range, one operating channel as the primary channel of the wireless communication 202. It is noted that, in case of uplink, the network device 210 may determine the primary channel of the uplink by sending a message to request the terminal device 220 to select the primary channel.

In some embodiments, for the downlink transmission 202-1, the network device 210 may determine, through the communication 214 between the network device 210 and the neighboring network device 230, an operating channel used by the neighboring network device 230 as the primary channel of a downlink transmission and/or an operating channel used by a terminal device served by the neighboring network device 230 as the primary channel. For example, the network device 210 can obtain, through X2 signaling or air interface signaling in a given bandwidth range, the primary channel used by the network device 230 and/or the primary channel used by a terminal device served by the network device 230.

On this basis, the network device 210 may select the determined operating channel as the primary channel for the downlink transmission 202-1 of the network device 210, or as the primary channel of the uplink transmission 202-2 of the terminal device 220. Optionally, the network device 210 can keep the primary channel the same as the strongest or closest neighboring network device (i.e., an adjacent cell). This would be advantageous because the network device 210 can still perform channel bonding even if the neighboring network device 230 occupies the adjacent channels of the primary channel, or because the terminal device 220 can also perform the channel bonding even if a terminal device served by the neighboring network device 230 occupies the adjacent channels of the primary channel. On the contrary, the network device 210 and the network device 230, or their served terminal devices can take full advantage of the entire bandwidth range to which the primary channel belongs in a time division multiplexing manner.

Alternatively or additionally, for the downlink transmission 202-1, the network device 210 can also (for example, dynamically) select the primary channel from the plurality of operating channels based on certain metrics. For example, these metrics may include a channel interference level (a duty cycle), a result of channel sensing, and a random manner or the like.

As mentioned above, the primary channel for the uplink transmission 202-2 can be selected by the network device 210 or the terminal device 220. Specifically, the network device 210 can flexibly indicate to the terminal device 220 a select mode of the primary channel for wideband access according to service requirements. The select mode can be implicitly or explicitly indicated to the terminal device 220. These two manners are described separately below with reference to FIGS. 5 and 6.

Figure 5:
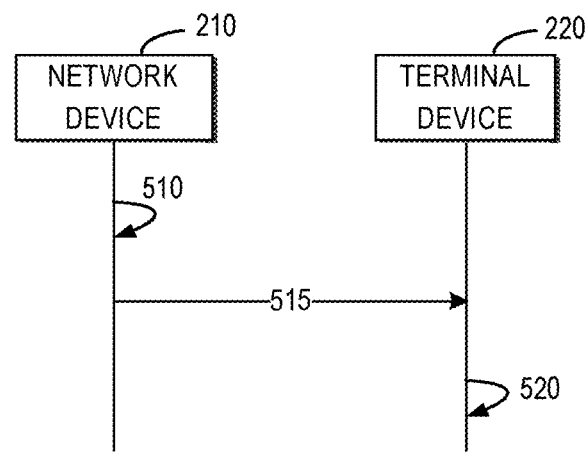
FIG. 5 illustrates an example diagram of signaling interactions between a network device and a terminal device in accordance with embodiments of the present disclosure.

FIG. 5 illustrates an example diagram of signaling interactions 500 between the network device 210 and the terminal device 220 in accordance with embodiments of the present disclosure. FIG. 5 depicts that the network device 210 implicitly indicates a select mode of the primary channel to the terminal device 220. The network device 210 can select 510, from a plurality of operating channels, an operating channel as a primary channel of the uplink transmission 202-2 from the terminal device 220 to the network device 210. Then, the network device 210 may send 515 to the terminal device 220 a message indicating the selected primary channel. In response, the terminal device 220 can access 520 the primary channel.

In other words, in the implicit manner depicted in FIG. 5, if the terminal device 220 receives a primary channel configuration for the uplink transmission 202-2, the primary channel is determined by the network device 210. Otherwise, the terminal device 220 can autonomously select from the configured bandwidth range an operating channel as the primary channel. The autonomous selection may be based on certain metrics, such as a channel interference level, a result of a clear channel assessment and the like.

FIG. 6 illustrates a further example diagram of signaling interactions 600 between the network device 210 and the terminal device 220 in accordance with embodiments of the present disclosure. FIG. 6 depicts that the network device 210 explicitly indicates a select mode of the primary channel to the terminal device 220. The network device 210 may send 610 to the terminal device 220 a message indicating that the terminal device 220 is to select the primary channel from a plurality of operating channels. For example, the message may be high layer RRC signaling or L1 UE/group-specific signaling. In response to receiving the message, the terminal device 220 may select 615 the primary channel from the plurality of operating channels. Then, the terminal device 220 accesses 625 the primary channel.

As an example, the explicit message can be one-bit information. If the one-bit information is set to 0, the network device 210 is to configure the primary channel for the wideband channel access for the uplink transmission 202-2. Otherwise, the terminal device 220 is to autonomously determine the primary channel, for example, based on a channel interference level, a result of a clear channel assessment and the like.

Additionally, in some embodiments, the terminal device 220 and the further terminal device 240 served by the network device 210 can operate in the same bandwidth range, and the network device 210 may determine, for the terminal device 220 and the further terminal device 240, the same operating channel as the primary channel. That is, if the primary channel of the multi-channel operations for the uplink transmission 202-2 is allocated by the network device 210, all terminal devices in the same bandwidth range can be configured with the same primary channel to increase a probability of the channel bonding.

Further advantageously, the above flexible select mode provided by the embodiments of the present disclosure can meet different service requirements and achieve a better tradeoff between transmission efficiency and latency. For example, allocating the primary channel to the eMBB terminal devices by the network device 210 can avoid breaking the channelization structure of the bonded channel, and thus enable a transmission with a maximum channel bandwidth as much as possible. In contrast, the eMTC terminal devices with a low bandwidth requirement can be configured to autonomously select the primary channel (for example, based on an interference condition or a result of a clear channel assessment), to implement fast channel access.

FIG. 7 illustrates a flowchart of a method 700 implemented at a terminal device in accordance with embodiments of the present disclosure. In some embodiments, the method 700 can be implemented for example at the terminal device 220 shown in FIG. 2. For the purpose of description, the method 700 is explained below with reference to the wireless communication system 200 of FIG. 2 and the division of the wireless system bandwidth 400 of FIG. 4, especially by taking the terminal device 220 as an example. It should be understood that other terminal devices (for example, the terminal device 240) in FIG. 2 can similarly perform the method 700.

As shown in FIG. 7, at 710, the terminal device 220 receives, from the network device 210 serving the terminal device 220, a first message indicating a bandwidth range for the uplink transmission 202-2 from the terminal device 220 to the network device 210. The bandwidth range is one of a plurality of non-overlapping bandwidth ranges 410-430 divided from the wireless system bandwidth 400 by the network device 210, and the plurality of bandwidth ranges 410-430 each includes a plurality of operating channels available for channel bonding. In addition, at 715, the terminal device 220 receives from the network device 210 a second message for determining one of the plurality of operating channels for the bandwidth range as a primary channel for the uplink transmission 202-2.

In some embodiments, the second message may indicate one of the plurality of operating channels as the primary channel, which corresponds to the above described implicit manner, through which the network device 210 informs the terminal device 220 that the primary channel is selected by the network device 210. In some further embodiments, the terminal device 220 can select, in response to receiving the second message, the primary channel from the plurality of operating channels based on at least one of: channel interference levels and results of clear channel assessments for the plurality of operating channels. This corresponds to the above described explicit manner, through which the network device 210 informs the terminal device 220 that the primary channel is to be selected by the terminal device 220. In some embodiments, the wireless system bandwidth 400 may include an unlicensed frequency band.

Figure 8:
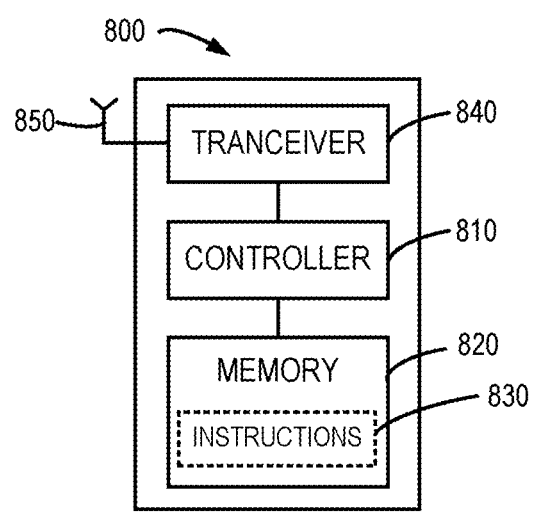
FIG. 8 illustrates a block diagram of a device suitable for implementing embodiments of the present disclosure.

FIG. 8 shows a block diagram of a device 800 suitable for implementing embodiments of the present disclosure. In some embodiments, the device 800 can be used for implementing network devices, for example, the network device 210 or 230 shown in FIG. 2. In some embodiments, the device 800 can be used for implement terminal devices, such as the terminal device 220 or 240 shown in FIG. 2.

According to FIG. 8, the device 800 comprises a controller 810, which controls operations and functions of the device 800. For example, in some embodiments, the controller 810 can execute various operations by means of instructions 830 stored in the memory 820 coupled to the controller 810.

The memory 820 can be any types suitable for local technology environment and can be implemented using any appropriate data storage techniques, including but not limited to, storage devices based on semiconductors, magnetic storage devices and systems thereof, and optical storage devices and systems thereof. It should be appreciated that although FIG. 8 only illustrates a memory 820, the device 800 may comprise several physically different memories.

The controller 810 can be any types suitable for local technology environment and may comprise but not limited to general-purpose computer, dedicated computer, microcontroller, digital signal processor (DSP) and one or more of a multi-core controller architecture based on controllers. The device also may comprise a plurality of controllers 810, which are coupled to the transceiver 840. The transceiver 840 can receive and transmit information via one or more antennas 850 and/or other components.

When the device 800 acts as the network device 210 or 230, the controller 810, the memory 820, the instructions 830 and the transceiver 840 can cooperate with each other to perform the method 300 described above with reference to FIG. 3. When the device 800 serves as the terminal device 220 or 240, the controller 810, the memory 820, the instructions 830 and the transceiver 840 can cooperate to perform the method 700 described above with reference to FIG. 7. All of the features described above with reference to FIGS. 2 to 7 are applicable to the device 800 and will not be repeated here.

It should be noted that embodiments of the present disclosure can be implemented by hardware, software or combinations of software and hardware. The hardware portion can be implemented by special logic; the software portion can be stored in the memory executed by a suitable instruction execution system, such as microprocessor or dedicated design hardware. Those skilled in the art can understand that the above device and method can be implemented by using computer executable instructions and/or including in the control codes of the processor, for example, providing such codes on the programmable memory or data carriers of optical or electronic signal carriers.

Further, although operations of the method of the present disclosure are described in a particular order in the drawings, it does not require or imply that these operations are necessarily performed according to this particular sequence, or a desired result can only be achieved by performing all shown operations. On the contrary, the execution order for the steps as depicted in the flowcharts may be varied. Additionally or alternatively, some steps can be omitted and a plurality of steps can be combined into one step for execution, and/or one step can be decomposed into a plurality of steps for execution. It should also be noted that features and functions of two or more apparatuses according to the present disclosure can be embodied in one apparatus whereas features and functions of one apparatus described above can be further divided and embodied by a plurality of apparatuses.

Although the present disclosure has been described with reference to various embodiments, it should be understood that the present disclosure is not limited to the disclosed embodiments. Various modifications and equivalent arrangements included in the spirit and scope of the appended claims is intended to be covered by the present disclosure.

We claim:

1. A method implemented at a network device, comprising:
    dividing a wireless system bandwidth into a plurality of non-overlapping bandwidth ranges each comprising a plurality of operating channels available for channel bonding;
    allocating one of the plurality of bandwidth ranges for a wireless communication between the network device and a terminal device served by the network device; and
    determining, from the plurality of operating channels for the allocated bandwidth range, one operating channel as a primary channel of the wireless communication,
    wherein allocating one bandwidth range for the wireless communication comprises
        determining, through a communication between the network device and a neighboring network device, at least one of a bandwidth range used by the neighboring network device and a bandwidth range used by a terminal device served by the neighboring network device, and
        selecting, from the plurality of bandwidth ranges, a bandwidth range non-overlapping with the determined bandwidth range for the wireless communication.

2. The method of claim 1, wherein allocating one bandwidth range for the wireless communication comprises:
    selecting the allocated bandwidth range from the plurality of bandwidth ranges based on at least one of: channel traffic loads of operating channels of the plurality of bandwidth ranges and a bandwidth requirement on the wireless communication.

3. The method of claim 1, wherein the terminal device is one of a plurality of terminal devices served by the network device, and wherein allocating one bandwidth range for the wireless communication comprises:
    dividing the plurality of terminal devices into a plurality of groups of terminal devices based on at least one of: service types, traffic levels, call types, and device identifiers of the plurality of terminal devices;
    selecting, from the plurality of bandwidth ranges, a bandwidth range for a group of terminal devices to which the terminal device belongs; and
    allocating the selected bandwidth range to the terminal device.

4. The method of claim 1, wherein allocating one bandwidth range for the wireless communication comprises:
    selecting, from the plurality of bandwidth ranges, a bandwidth range for an uplink transmission from the terminal device to the network device; and
    sending to the terminal device a message indicating the selected bandwidth range.

5. The method of claim 1, wherein determining the primary channel comprises: determining, through a communication between the network device and a neighboring network device, at least one of: an operating channel used by the neighboring network device as a primary channel and an operating channel used by a terminal device served by the neighboring network device as a primary channel; and
    selecting the determined operating channel as the primary channel.

6. The method of claim 1, wherein determining the primary channel comprises: selecting the primary channel from the plurality of operating channels based on at least one of: a channel interference level, a result of channel sensing, and a random manner.

7. The method of claim 1, wherein the terminal device and a further terminal device served by the network device operate in a same bandwidth range, and wherein determining the primary channel comprises:
    determining a same operating channel for the terminal device and the further terminal device as the primary channel.

8. The method of claim 1, wherein determining the primary channel comprises: selecting, from the plurality of operating channels, an operating channel as a primary channel of an uplink transmission from the terminal device to the network device; and
    sending to the terminal device a message indicating the selected primary channel.

9. The method of claim 1, wherein determining the primary channel comprises: sending to the terminal device a message indicating that the primary channel is to be selected from the plurality of operating channels by the terminal device.

10. The method of claim 1, wherein the wireless system bandwidth comprises an unlicensed frequency band.

11. A non-transitory computer-readable medium storing machine-executable instructions, which when executed cause a machine to perform the method of claim 1.

12. A method implemented at a terminal device, comprising:
    receiving, from a network device serving the terminal device, a first message indicating a bandwidth range for an uplink transmission from the terminal device to the network device, wherein the bandwidth range for the uplink transmission is determined based on a communication between the network device and a neighboring network device, the bandwidth range being one of a plurality of non-overlapping bandwidth ranges divided from a wireless system bandwidth by the network device such that the indicated bandwidth range is non-overlapping with at least one of a bandwidth range used by the neighboring network device and a bandwidth range used by a terminal device served by the neighboring network device, the plurality of non-overlapping bandwidth ranges each comprising a plurality of operating channels for channel bonding; and receiving, from the network device, a second message for determining one of the plurality of operating channels for the bandwidth range as a primary channel for the uplink transmission.

13. The method of claim 12, wherein the wireless system bandwidth comprises an unlicensed frequency band.

14. A non-transitory computer-readable medium storing machine-executable instructions, which when executed cause a machine to perform the method of claim 12.

15. A network device, comprising:
at least one processor; and
at least one memory comprising computer program instructions, the at least one memory and the computer program instructions being configured, with the at least one processor, to cause the network device to:
divide a wireless system bandwidth into a plurality of non-overlapping bandwidth ranges each comprising a plurality of operating channels available for channel bonding;
allocate one of the plurality of bandwidth ranges for a wireless communication between the network device and a terminal device served by the network device; and
determine, from the plurality of operating channels for the allocated bandwidth range, one operating channel as a primary channel of the wireless communication,
wherein, for the allocation of the one of the plurality of bandwidth ranges, the at least one memory and the computer program instructions are configured, with the at least one processor, to cause the network device to
determine, through a communication between the network device and a neighboring network device, at least one of a bandwidth range used by the neighboring network device and a bandwidth range used by a terminal device served by the neighboring network device, and
select, from the plurality of bandwidth ranges, a bandwidth range non-overlapping with the determined bandwidth range for the wireless communication.

16. The network device of claim 15, wherein the at least one memory and the computer program instructions are further configured, with the at least one processor, to cause the network device to:
select the allocated bandwidth range from the plurality of bandwidth ranges based on at least one of: channel traffic loads of operating channels of the plurality of bandwidth ranges and a bandwidth requirement on the wireless communication.

17. The network device of claim 15, wherein the terminal device is one of a plurality of terminal devices served by the network device, and wherein the at least one memory and the computer program instructions are further configured, with the at least one processor, to cause the network device to:
divide the plurality of terminal devices into a plurality of groups of terminal devices based on at least one of: service types, traffic levels, call types and device identifiers of the plurality of terminal devices;
select, from the plurality of bandwidth ranges, a bandwidth range for a group of terminal devices to which the terminal device belongs; and
allocate the selected bandwidth range to the terminal device.

18. The network device of claim 15, wherein the at least one memory and the computer program instructions are further configured, with the at least one processor, to cause the network device to:
select, from the plurality of bandwidth ranges, a bandwidth range for an uplink transmission from the terminal device to the network device; and
send to the terminal device a message indicating the selected bandwidth range.

19. The network device of claim 15, wherein the at least one memory and the computer program instructions are further configured, with the at least one processor, to cause the network device to:
determine, through a communication between the network device and a neighboring network device, at least one of: an operating channel used by the neighboring network device as a primary channel and an operating channel used by a terminal device served by the neighboring network device as a primary channel; and
select the determined operating channel as the primary channel.

20. The network device of claim 15, wherein the at least one memory and the computer program instructions are further configured, with the at least one processor, to cause the network device to:
select the primary channel from the plurality of operating channels based on at least one of: a channel interference level, a result of channel sensing, and a random manner.

21. The network device of claim 15, wherein the terminal device and a further terminal device served by the network device operate in a same bandwidth range, and wherein the at least one memory and the computer program instructions are further configured, with the at least one processor, to cause the network device to:
determine a same operating channel for the terminal device and the further terminal device as the primary channel.

22. The network device of claim 15, wherein the at least one memory and the computer program instructions are further configured, with the at least one processor, to cause the network device to:
select, from the plurality of operating channels, an operating channel as a primary channel of an uplink transmission from the terminal device to the network device; and
send to the terminal device a message indicating the selected primary channel.

23. The network device of claim 15, wherein the at least one memory and the computer program instructions are further configured, with the at least one processor, to cause the network device to:
send to the terminal device a message indicating that the primary channel is to be selected from the plurality of operating channels by the terminal device.

24. The network device of claim 15, wherein the wireless system bandwidth comprises an unlicensed frequency band.

25. A terminal device, comprising:
at least one processor; and
at least one memory including computer program instructions, the at least one memory and the computer program instructions being configured, with the at least one processor, to cause the terminal device to:

receive, from a network device serving the terminal device, a first message indicating a bandwidth range for an uplink transmission from the terminal device to the network device, wherein the bandwidth range for the uplink transmission is determined based on a communication between the network device and a neighboring network device, the bandwidth range being one of a plurality of non-overlapping bandwidth ranges divided from a wireless system bandwidth by the network device such that the indicated bandwidth range is non-overlapping with at least one a bandwidth range used by the neighboring network device and a bandwidth range used by a terminal device served by the neighboring network device, the plurality of non-overlapping bandwidth ranges each comprising a plurality of operating channels for channel bonding; and receive, from the network device, a second message for determining one of the plurality of operating channels for the bandwidth range as a primary channel for the uplink transmission.

26. The terminal device of claim 25, wherein the wireless system bandwidth comprises an unlicensed frequency band.

* * * * *